G. H. BICKFORD.
STONE SAW APPARATUS.
APPLICATION FILED SEPT. 26, 1911.
1,097,747.
Patented May 26, 1914.
3 SHEETS—SHEET 1.
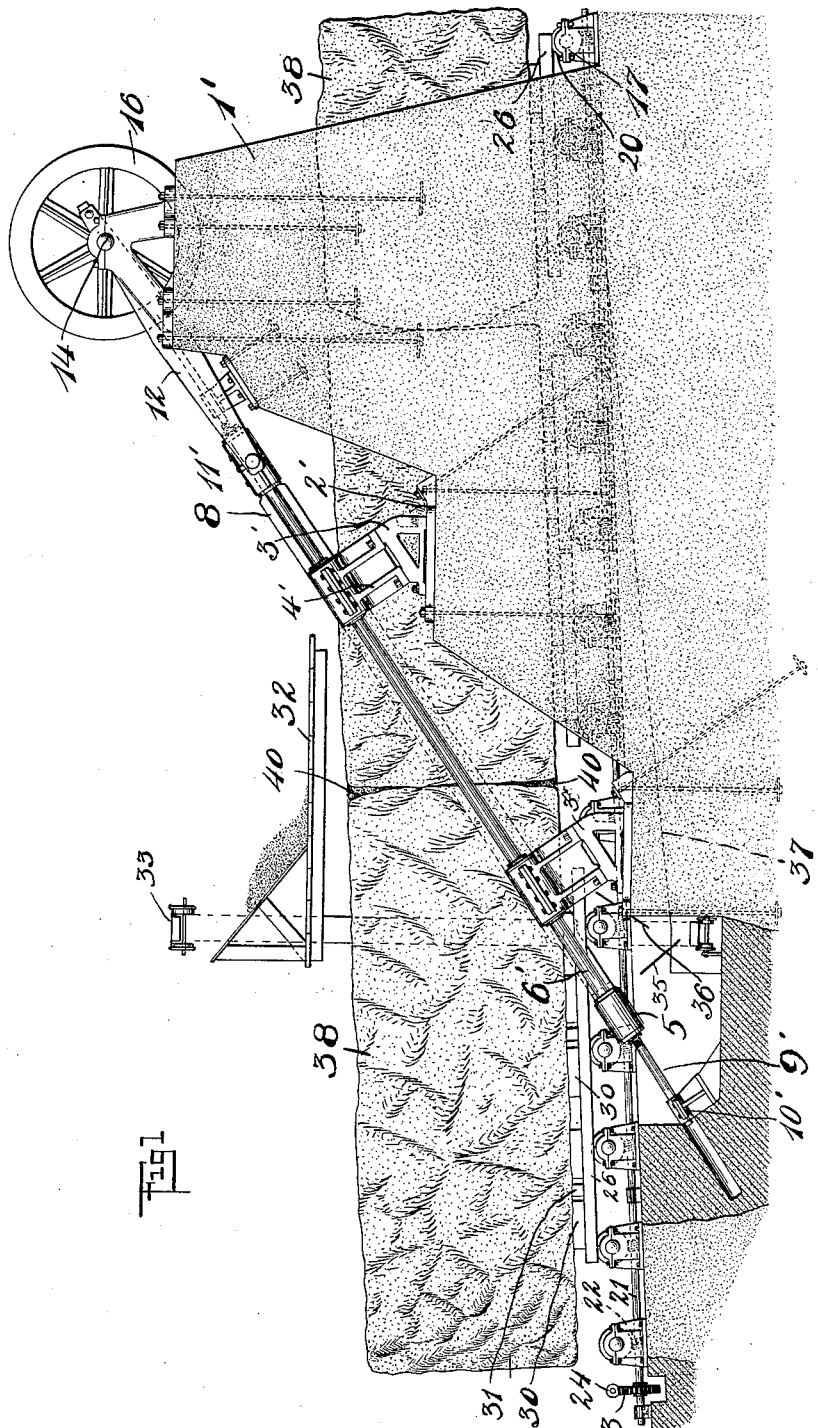
WITNESSES
Chas A. Pearl
Lillian S. James
INVENTOR
G. H. Bickford
BY
Bartlett, Maxwell & Mitchell ATTORNEYS G. H. BICKFORD.
STONE SAW APPARATUS.
APPLICATION FILED SEPT. 25, 1911.
1,097,747.
Patented May 26, 1914.
3 SHEETS—SHEET 2.
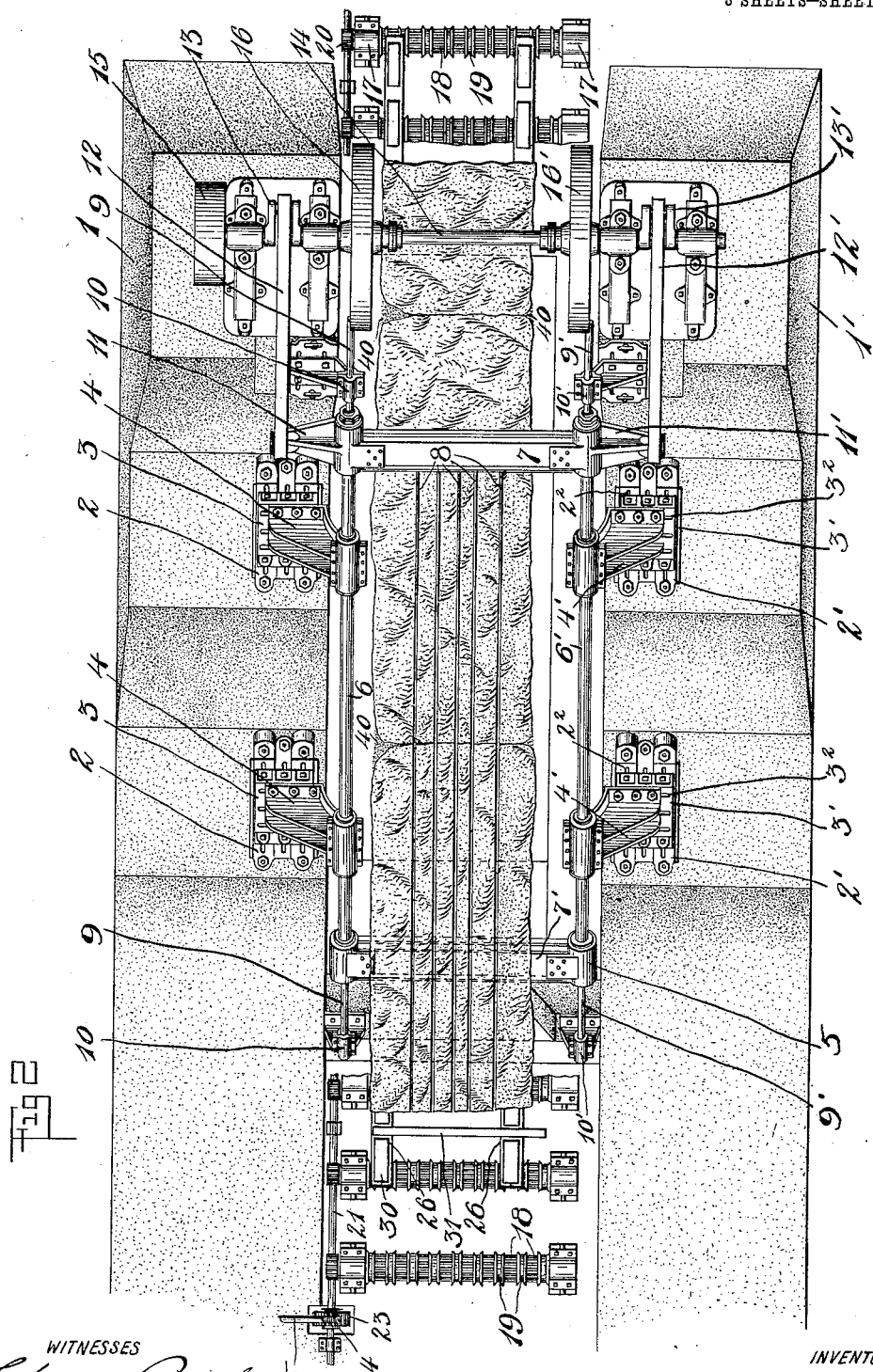
WITNESSES
Chas. A. Peard
Lillian L. James
INVENTOR
G. H. Bickford
BY Bartlett, Brownell & Mitchell ATTORNEYS

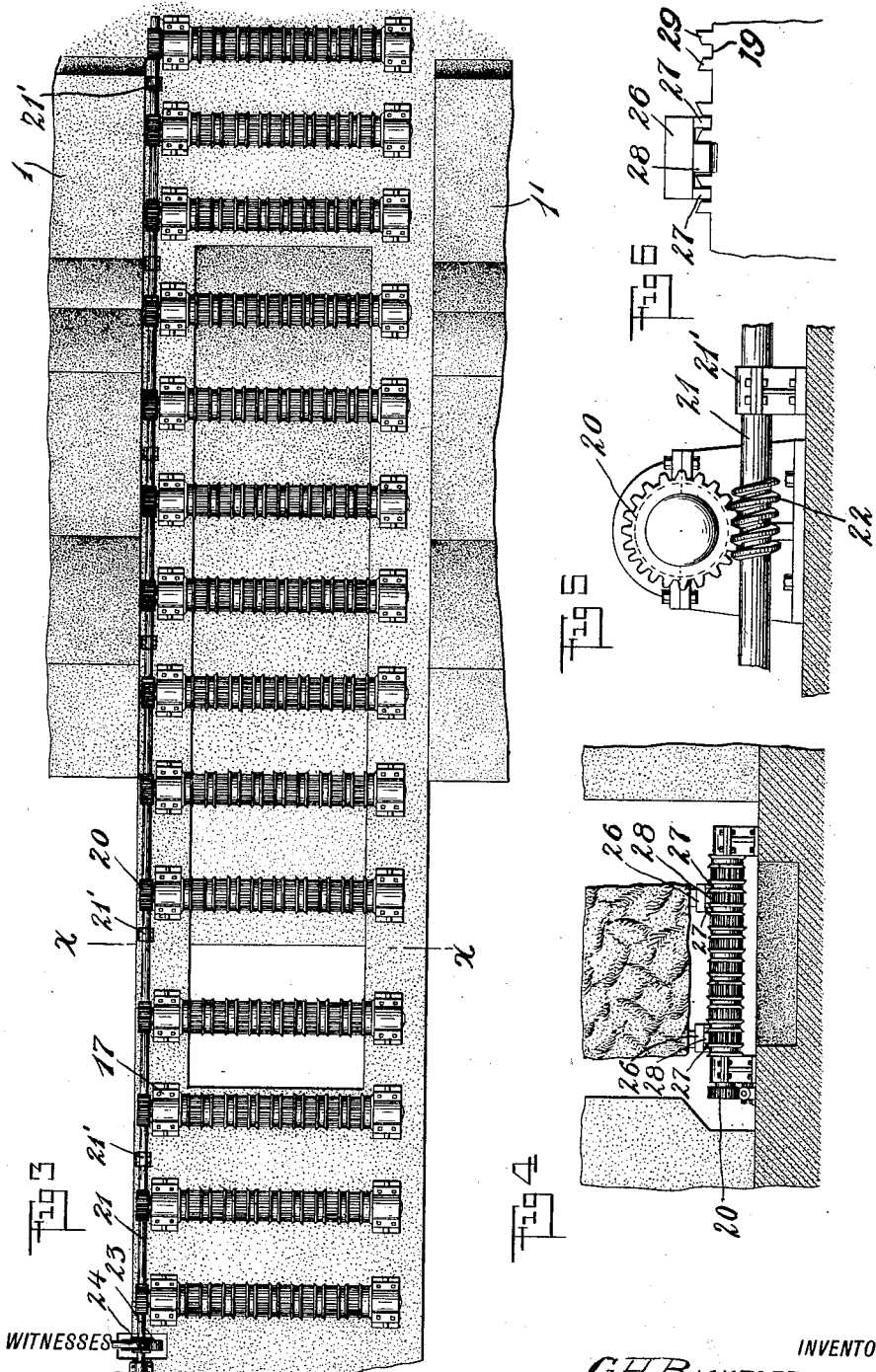

UNITED STATES PATENT OFFICE.

GEORGE H. BICKFORD, OF HARDWICK, VERMONT.

STONE-SAW APPARATUS.

1,097,747.  Specification of Letters Patent.  Patented May 26, 1914.

Application filed September 25, 1911. Serial No. 651,060.

*To all whom it may concern:*

Be it known that I, GEORGE H. BICKFORD, a citizen of the United States, residing at Hardwick, county of Caledonia, State of Vermont, have invented certain new and useful Improvements in Stone-Saw Apparatus, of which the following is a full, clear, and exact description.

My invention relates to stone sawing apparatus, and has for its object to provide a new and improved apparatus which will saw stones of any length.

It further has for its object to provide an apparatus which will operate continuously to saw an indefinite series of stones.

It further has for its object to provide a moving platform which is adjustable in width so as to support the edges of stones of varying widths.

It further has for its object to provide a series of platforms whereby an indefinite series of stones can be cut.

It further has for its object to provide a new and improved means for supporting and moving such platforms.

It further has for its object to provide other new and useful features hereinafter particularly described and pointed out in the claims.

Referring more particularly to the drawings, Figure 1 shows a side elevation of an apparatus embodying my invention. Fig. 2 is a plan view of the same, the stones being slightly broken off to show certain details. Fig. 3 shows a plan view of the means for supporting the moving platform. Fig. 4 is a transverse section on the line $x$—$x$ Fig. 3, showing the platforms and means for supporting them. Fig. 5 is a detail of the worm shaft, bearing supporting the same, and a roller gear operated thereby. Fig. 6 is an enlarged diagrammatic detail of the platform supporting means to show the bevels on the flanges.

Referring more particularly to the drawings, 1—1' are massive piers of concrete.

2—2 and 2'—2' are bed plates bolted to the piers.

3—3 and 3'—3' are chairs bolted to the bed plates.

4—4 and 4'—4' are slide bearings bolted to the chairs.

The bed plates are provided with slots $2^2$ for the bolts, whereby the chairs are longitudinally adjustable thereon. The chairs are provided with elongated slots $3^2$—$3^2$ whereby the bearings are laterally adjustable thereon. Supported by the bearings is a reciprocating saw frame 5 having side bars 6—6' passing through the bearings 4—4 and 4'—4' respectively, and end pieces 7—7' connected to the side bars 6—6'. Between the end pieces are saw blades 8, fastened thereto in the usual manner. The side bars 6—6' are provided with extensions 9—9', which reciprocate in stationary bearings 10—10—10'—10' to assist in steadying the ends of the frame. The end piece 7 has lateral projections 11—11' to which are connected pitmen 12—12'. The pitmen are in turn connected to cranks 13—13' on a crank shaft 14, mounted on the piers above the upper end of the frame 5. This shaft is provided with a driving pulley 15 and with fly-wheels 16—16'. When power is applied through the driving pulley 15, the saw frame is reciprocated in the bearings 4—4—4'—4'. The bearings 4—4 and 4'—4' are inclined so as to hold the frame in an inclined position with its downward end pointing in the direction of the forward end of the stone being sawed.

Between the piers 1—1' is a series of shafts or rollers mounted in bearings 17 and having gear teeth 18 and cylindrical surfaces 19, the cylindrical surfaces coinciding with the pitch line of the gears 18. As shown, each roller has eight sets of gears and nine cylindrical surfaces. These gear teeth 18 are rigidly mounted upon the shaft of the roll, which shaft terminates in a gear 20. The cylindrical surfaces are preferably also rigidly mounted on said shaft. A shaft 21 mounted in bearings 21', carries worms 22 and is driven by a worm 23, which in turn is driven by a worm 24 mounted on a shaft 25, driven by any suitable source of power. Supported by the rollers 17 are two series of disconnected sectional platforms 26, parallel to each other, each platform having two downwardly projecting longitudinal flanges 27, which engage with two of the cylindrical surfaces 19. Between the flanges 27 is a rack 28 which engages a series of gear teeth 18 on the several shafts. On both sides of each cylindrical surface 19, engaged by a flange 27, are flanges 29 beveled toward each other, as shown in enlarged detail in Fig. 6, so as to guide the flanges 27 into position to engage the cylindrical surfaces 19. The plurality of gears 18 and cylindrical surfaces 19 on each roller enables the platforms 26 to be placed at different distances laterally from one another so as to come under the edges of stones of varying width. The platforms 26 are provided with projections 30 having spaces between them through which rods 31 can be passed for supporting the forward ends of slabs of a partially cut stone, or supporting both ends of said slabs when the stone is nearly or completely sawed through. The series of rollers, though substantially horizontal, is slightly inclined in the direction that the stone to be sawed is moving, whereby gravity assists in the movement of the stone.

32 is a platform for the shot or other abradant which is shoveled from that point to the saws where they enter the upper portion of the stone.

33 is a conveyer diagrammatically shown passing from beneath the stone to above the platform 32 for conveying the shot which has been used from beneath the stone to the platform.

35 and 36 are inclines for receiving the shot as it passes from the stone and directing it into the pockets of the conveyer.

37 is an incline down which the shot which falls at other portions of the length of the stone is washed into the pockets of the conveyer.

38 are the stones being sawed. A series of these stones is placed upon a double series of platforms 26 and fed toward the saws. When the foremost stone is partially cut, the rods 31 are placed in position so as to support the slabs. When the forward stone is completely cut, the slabs thus formed are removed and the platforms 26, which are thus released, are carried to the rear end of the machine and placed in alinement with the other platforms 26 still in use, and a new stone is placed upon them. By removing cut stones and transferring the platforms 26 to the rear end, an endless series of stones can be cut without stopping the machine. The sections are longer than the distance between the axes of two successive shafts bearing driving gears on the feed side of the saw frame, with the result that at least one driving gear is always in engagement with each rack on the feed side. They are also preferably of such length that each section always has at least two supporting rollers always beneath it. In order to prevent the shot from passing downward between two stones in this endless series, I fill the spaces between the abutting ends of each pair of adjacent stones with cement 40 as soon as the stones are placed in position, with the result that the shot is always compelled to travel the full length of the portion of the saw blade which is within two adjacent stones.

The structure is exceedingly rigid by reason of the massive piers 1—1', and the supports for the saw frame rigidly secured thereto, and accomplishes the various objects above referred to.

My invention permits of various modifications of the embodiment above described, without departing from the spirit thereof or from the scope of the claims appended thereto.

What I claim is:

1. In a stone sawing apparatus, the combination of a saw frame extending above and below the stone to be sawed, two parallel series of platforms each series being composed of independent sections, those of one series being disconnected from those of the other, said platforms being each provided with racks on their under sides, a plurality of gears rotating on different axes on the feed side of the saw frame engaging said racks and so located that each platform rack is always engaged by at least one gear, and means for synchronously driving said gears.

2. In a sawing apparatus, the combination of a saw frame extending above and below the stone to be sawed, two series of platforms, each series being made up of a plurality of independent successive sections, supporting rollers so spaced that a plurality of such rollers are always below each platform section on both the feed side and the discharge side of the saw frame, a plurality of gears rotating on different axes on the feed side of the saw frame so spaced that there is always one gear beneath each section, a rack on the under part of each section for engagement with said gears, and means for synchronously driving said gears.

3. In a sawing apparatus, the combination of a saw frame, two series of platforms, each series being made up of a plurality of independent sections, a plurality of transverse shafts under each platform section on both sides of the saw frame, each shaft carrying rollers, said shafts being so spaced that there is always a plurality of rollers beneath each section, gears on a plurality of said shafts on the feed side of said saw frame alternating with the said rollers thereon, a rack on each of said several sections always engaging at least one of said gears, and means for synchronously driving said gears.

4. In a stone sawing apparatus, the combination of a saw frame extending above and below the stone to be sawed, two parallel series of separable platforms, those of one series being disconnected from those of the other, said platforms being adapted to engage the outer edges of the stones to be sawed and being provided with recesses in their upper surfaces, and bars adapted to be inserted in said recesses so as to bridge opposite platforms and support the sawed portions of said stones.

5. In a stone sawing apparatus, the combination of a saw frame extending above and below the stone to be sawed, two parallel series of separable platforms, those of one series being disconnected from those of the other, said platforms being adapted to engage the outer edges of the stones to be sawed and being provided with recesses in their upper surfaces, bars adapted to be inserted in said recesses so as to bridge opposite platforms and support the sawed portions of said stones, and a plurality of saws in said frame, said saws all passing between two adjacent series of platforms.

GEORGE H. BICKFORD.

Witnesses:
W. T. JOHNSON,
C. W. HUNTINGTON.

Copies of this patent may be obtained for five cents each, by addressing the "Commissioner of Patents, Washington, D. C."